US012535622B2

(12) United States Patent
Moon et al.

(10) Patent No.: US 12,535,622 B2
(45) Date of Patent: Jan. 27, 2026

(54) CAMERA MODULE AND ELECTRONIC DEVICE INCLUDING THE SAME

(71) Applicant: Samsung Electronics Co., Ltd., Suwon-si (KR)

(72) Inventors: Youngmin Moon, Suwon-si (KR); Jaehyun Bae, Suwon-si (KR); Changsu Lee, Suwon-si (KR); Hyeunwoong Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 18/187,836

(22) Filed: Mar. 22, 2023

(65) Prior Publication Data

US 2024/0012182 A1 Jan. 11, 2024

Related U.S. Application Data

(63) Continuation of application No. PCT/KR2023/003370, filed on Mar. 13, 2023.

(30) Foreign Application Priority Data

Jul. 11, 2022 (KR) .................. 10-2022-0085057
Aug. 5, 2022 (KR) .................. 10-2022-0097870

(51) Int. Cl.
G02B 3/04 (2006.01)
G02B 1/115 (2015.01)
(Continued)

(52) U.S. Cl.
CPC ............... G02B 3/04 (2013.01); G02B 1/115 (2013.01); G02B 7/021 (2013.01); H04M 1/0264 (2013.01)

(58) Field of Classification Search
CPC .......... G02B 7/02; G02B 7/021; G02B 7/022; G02B 7/023; G02B 7/025; G02B 7/026; G02B 1/11; G02B 1/115
See application file for complete search history.

(56) References Cited

U.S. PATENT DOCUMENTS 7,969,666 B2 * 6/2011 Chen ................. G02B 7/021
359/813
9,678,336 B2 6/2017 Cho et al.
(Continued)

FOREIGN PATENT DOCUMENTS

JP 2021-033197 A 3/2021
JP 2021-036301 A 3/2021
(Continued)

OTHER PUBLICATIONS

International Search Report and Written Opinion dated Jun. 19, 2023, issued in International Patent Application No. PCT/KR2023/003370.
(Continued)

Primary Examiner — Ephrem Z Mebrahtu
(74) Attorney, Agent, or Firm — Jefferson IP Law, LLP

(57) ABSTRACT

A camera module is provided. The camera module includes a lens housing and at least one compound lens disposed in the lens housing and including a first lens and a second lens. At least a portion of facing surfaces of a first flange of the first lens and a second flange of the second lens may include a roughened surface.

21 Claims, 13 Drawing Sheets

(51) Int. Cl.
*G02B 7/02* (2021.01)
*H04M 1/02* (2006.01)

(56) References Cited

U.S. PATENT DOCUMENTS

| | | | |
|---|---|---|---|
| 9,864,160 B2 | 1/2018 | Lin et al. | |
| 11,307,375 B2 | 4/2022 | Chou | |
| 11,762,164 B2 | 9/2023 | Yang et al. | |
| 2009/0225447 A1* | 9/2009 | Chang | G02B 7/02 359/796 |
| 2013/0057950 A1* | 3/2013 | Lin | G02B 1/115 359/581 |
| 2014/0347738 A1 | 11/2014 | Tsai | |
| 2015/0062727 A1* | 3/2015 | Kang | G02B 3/00 359/793 |
| 2017/0248739 A1* | 8/2017 | Matsuo | G02B 5/208 |
| 2020/0103611 A1 | 4/2020 | Yang et al. | |
| 2020/0142150 A1* | 5/2020 | Chou | G02B 7/022 |
| 2020/0217994 A1 | 7/2020 | Wang | |
| 2021/0063674 A1 | 3/2021 | Chen et al. | |
| 2022/0099863 A1* | 3/2022 | Hirano | G02B 7/008 |
| 2023/0025851 A1* | 1/2023 | Matsumoto | G02F 1/133504 |
| 2025/0044556 A1* | 2/2025 | Seo | G02B 13/0065 |

FOREIGN PATENT DOCUMENTS

| | | |
|---|---|---|
| KR | 10-1525673 B1 | 6/2015 |
| KR | 10-2018-0129162 A | 12/2018 |
| KR | 10-2087983 B1 | 3/2020 |
| KR | 10-2020-0036496 A | 4/2020 |
| KR | 10-2021-0044552 A | 4/2021 |
| KR | 10-2250168 B1 | 5/2021 |
| WO | 2012/086263 A1 | 6/2012 |

OTHER PUBLICATIONS

Extended European Search Report dated Jun. 11, 2025, issued in European Application No. 23839740.0-1001.

* cited by examiner

CAMERA MODULE AND ELECTRONIC DEVICE INCLUDING THE SAME

CROSS-REFERENCE TO RELATED APPLICATION(S)

This application is a continuation application, claiming priority under § 365(c), of an International application No. PCT/KR2023/003370, filed on Mar. 13, 2023, which is based on and claims the benefit of a Korean patent application number 10-2022-0085057, filed on Jul. 11, 2022, in the Korean Intellectual Property Office, and of a Korean patent application number 10-2022-0097870, filed on Aug. 5, 2022, in the Korean Intellectual Property Office, the disclosure of each of which is incorporated by reference herein in its entirety.

BACKGROUND

1. Field

The disclosure relates to a camera module and an electronic device including the same.

2. Description of Related Art

"Electronic device" may refer to a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, and the like. For example, electronic devices outputs stored information as voices or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function. Such electronic devices become compact enough for users to carry in a convenient way.

As electronic devices are downsized, the size of camera modules decreases. More cameras need to be placed in the camera module to enhance the performance of the camera module, but this may cause the camera module bulkier (or thicker).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus including camera module with a lens housing and at least one compound lens disposed in the lens housing and including a first lens and a second lens.

Additional aspects will be set forth in part in the description which follows and, in part, will be apparent from the description, or may be learned by practice of the presented embodiments.

In accordance with an aspect of the disclosure, a camera module is provided. The camera module includes a lens housing and at least one compound lens disposed in the lens housing and including a first lens and a second lens. At least a portion of facing surfaces of a first flange of the first lens and a second flange of the second lens may include a roughened surface.

In accordance with another aspect of the disclosure, an electronic device is provided. The electronic device includes a device housing and a camera module including a lens housing, at least one compound lens disposed in the lens housing and including a first lens and a second lens, the at least one compound lens disposed toward one surface of the device housing inside the device housing. At least a portion of facing surfaces of a first flange of the first lens and a second flange of the second lens may include a roughened surface.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
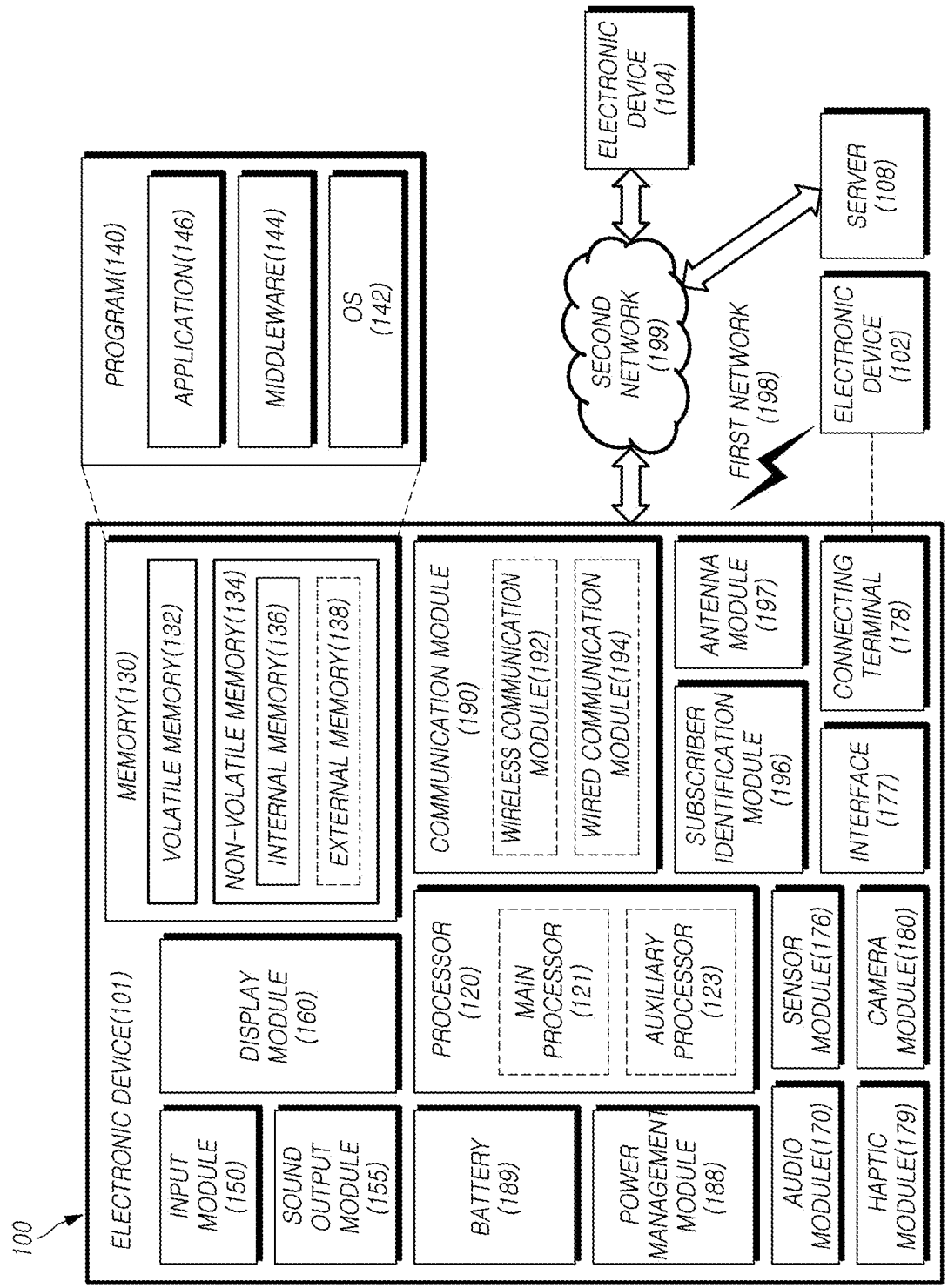
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a $5^{th}$ generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2A:
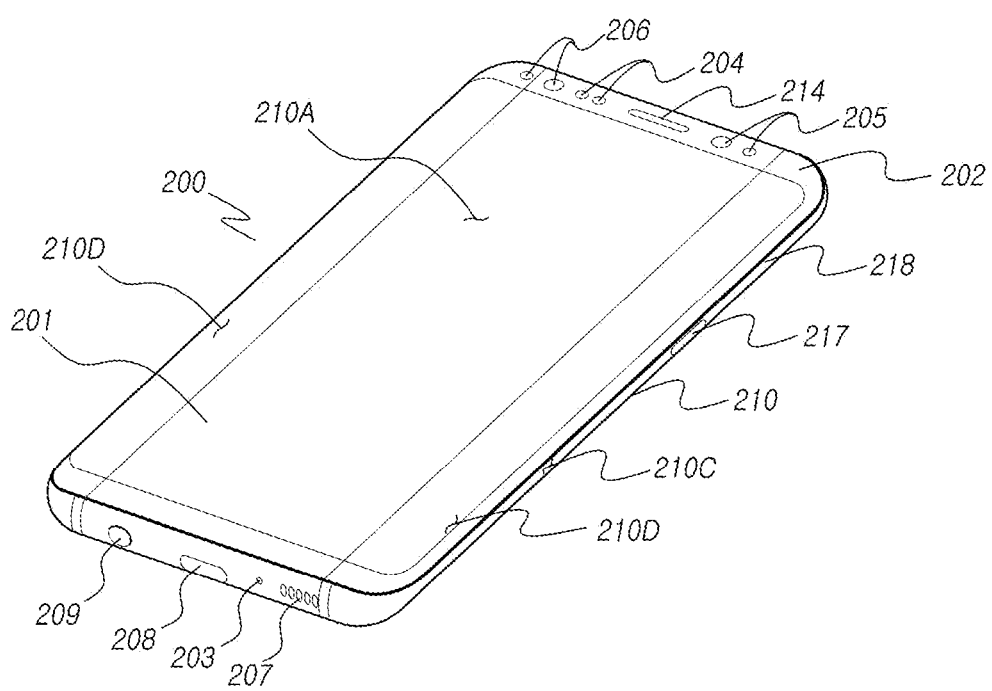
FIG. 2A is a front perspective view illustrating an electronic device according to an embodiment of the disclosure.

FIG. 2A is a front perspective view illustrating an electronic device (e.g., the electronic device 101 of FIG. 1) according to an embodiment of the disclosure.

Figure 2B:
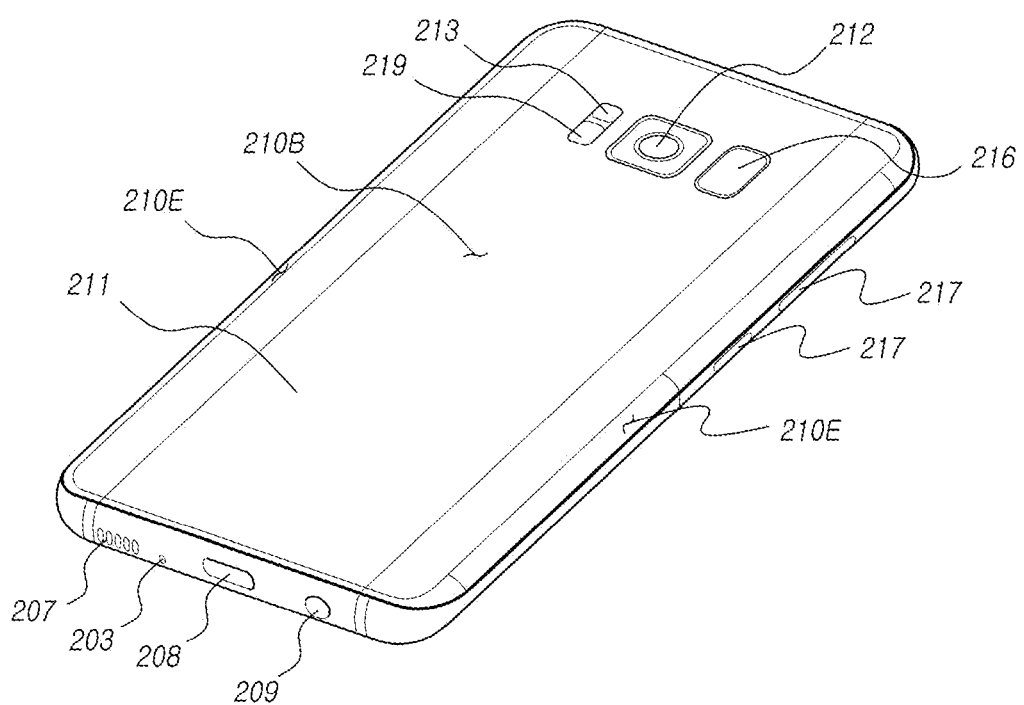
FIG. 2B is a rear perspective view illustrating the electronic device of FIG. 2A according to an embodiment of the disclosure.

FIG. 2B is a rear perspective view illustrating an electronic device of FIG. 2A according to an embodiment of the disclosure.

Referring to FIGS. 2A and 2B, according to an embodiment, an electronic device 200 may include a housing 210 including a first surface (or front surface) 210A, a second surface (or rear surface) 210B, and a side surface 210C surrounding a space between the first surface 210A and the second surface 210B. According to another embodiment (not shown), the housing may denote a structure forming part of the first surface 210A, the second surface 210B, and the side surface 210C of FIG. 1. According to an embodiment, the first surface 210A may be formed by a front plate 202 (e.g., a glass plate or polymer plate with various coat layers) at least part of which is substantially transparent. The second surface 210B may be formed by a rear plate 211 that is substantially opaque. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side bezel structure (or a "side member") 218 that couples to the front plate 202 and the rear plate 211 and includes a metal and/or polymer. According to an embodiment, the rear plate 211 and the side bezel structure 218 may be integrally formed together and include the same material (e.g., a metal, such as aluminum).

In the embodiment illustrated, the front plate 202 may include two first areas 210D, which seamlessly and bendingly extend from the first surface 210A to the rear plate 211, on both the long edges of the front plate 202. In the embodiment (refer to FIG. 2B) illustrated, the rear plate 211 may include second areas 210E, which seamlessly and bendingly extend from the second surface 210B to the front plate 202, on both the long edges. According to an embodiment, the front plate 202 (or the rear plate 211) may include only one of the first areas 210D (or the second areas 210E). Alternatively, the first areas 210D or the second areas 210E may partially be excluded. According to an embodiment, at side view of the electronic device 200, the side bezel structure 218 may have a first thickness (or width) for sides that do not have the first areas 210D or the second areas 210E and a second thickness, which is smaller than the first thickness, for sides that have the first areas 210D or the second areas 210E. In an embodiment, the first areas 210D or second areas 210E may be formed to be flat to, together the first surface 210A or second surface 210B, form substantially one flat surface without bending.

According to an embodiment, the electronic device 200 may include at least one or more of a display 201, audio modules 203, 207, and 214, sensor modules 204, 216, and 219, camera modules 205, 212, and 213, key input devices 217, a light emitting device 206, and connector holes 208 and 209. According to an embodiment, the electronic device 200 may exclude at least one (e.g., the key input device 217 or the light emitting device 206) of the components or may add other components.

The display 201 may be exposed through a significant portion of the front plate 202. According to an embodiment, at least a portion of the display 201 may be exposed through the front plate 202 forming the first surface 210A and the first areas 210D of the side surface 210C. According to an embodiment, the edge of the display 201 may be formed to be substantially the same in shape as an adjacent outer edge of the front plate 202. According to another embodiment (not shown), the interval between the outer edge of the display 201 and the outer edge of the front plate 202 may remain substantially even to give a larger area of exposure the display 201.

According to an embodiment (not shown), the screen display area of the display 201 may have a recess or opening in a portion thereof, and at least one or more of the audio module 214, sensor module 204, camera module 205, and light emitting device 206 may be aligned with the recess or opening. According to another embodiment (not shown), at least one or more of the audio module 214, sensor module 204, camera module 205, fingerprint sensor 216, and light emitting device 206 may be included on the rear surface of the screen display area of the display 201. According to an embodiment (not shown), the display 201 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 204 and 219 and/or at least part of the key input devices 217 may be disposed in the first areas 210D and/or the second areas 210E.

The audio modules 203, 207, and 214 may include a microphone hole 203 and speaker holes 207 and 214. The microphone hole 203 may have a microphone inside to obtain external sounds. According to an embodiment, there may be a plurality of microphones to be able to detect the direction of a sound. The speaker holes 207 and 214 may include an external speaker hole 207 and a phone receiver hole 214. According to an embodiment, the speaker holes 207 and 214 and the microphone hole 203 may be implemented as a single hole, or speakers may be rested without the speaker holes 207 and 214 (e.g., piezo speakers).

The sensor modules 204, 216, and 219 may generate an electrical signal or data value corresponding to an internal operating state or external environmental state of the electronic device 200. The sensor modules 204, 216, and 219 may include a first sensor module 204 (e.g., a proximity sensor) disposed on the first surface 210A of the housing 210, and/or a second sensor module (not shown) (e.g., a fingerprint sensor), and/or a third sensor module 219 (e.g., a heart-rate monitor (HRM) sensor) disposed on the second surface 210B of the housing 210, and/or a fourth sensor module 216 (e.g., a fingerprint sensor). The fingerprint sensor may be disposed on the second surface 210B as well as on the first surface 210A (e.g., the display 201) of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (i.e., first sensor module 204).

The camera modules 205, 212, and 213 may include a first camera device 205 disposed on the first surface 210A of the electronic device 200, and a second camera device 212 and/or a flash 213 disposed on the second surface 210B. The camera devices 205 and 212 may include one or more lenses, an image sensor, and/or an image signal processor. The flash 213 may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 200.

The key input device 217 may be disposed on the side surface 210C of the housing 210. According to another embodiment, the electronic device 200 may exclude all or some of the above-mentioned key input devices 217 and the excluded key input devices 217 may be implemented in other forms, e.g., as soft keys, on the display 201. According to an embodiment, the key input device may include the sensor module 216 disposed on the second surface 210B of the housing 210.

The light emitting device 206 may be disposed on, e.g., the first surface 210A of the housing 210. The light emitting device 206 may provide, e.g., information about the state of the electronic device 200 in the form of light. According to an embodiment, the light emitting device 206 may provide a light source that interacts with, e.g., the camera module 205. The light emitting device 206 may include, e.g., a light emitting diode (LED), an infrared (IR) LED, or a xenon lamp.

The connector holes 208 and 209 may include a first connector hole 208 for receiving a connector (e.g., a universal serial bus (USB) connector) for transmitting or receiving power and/or data to/from an external electronic device and/or a second connector hole 209 (e.g., an earphone jack) for receiving a connector for transmitting or receiving audio signals to/from the external electronic device.

Figure 3:
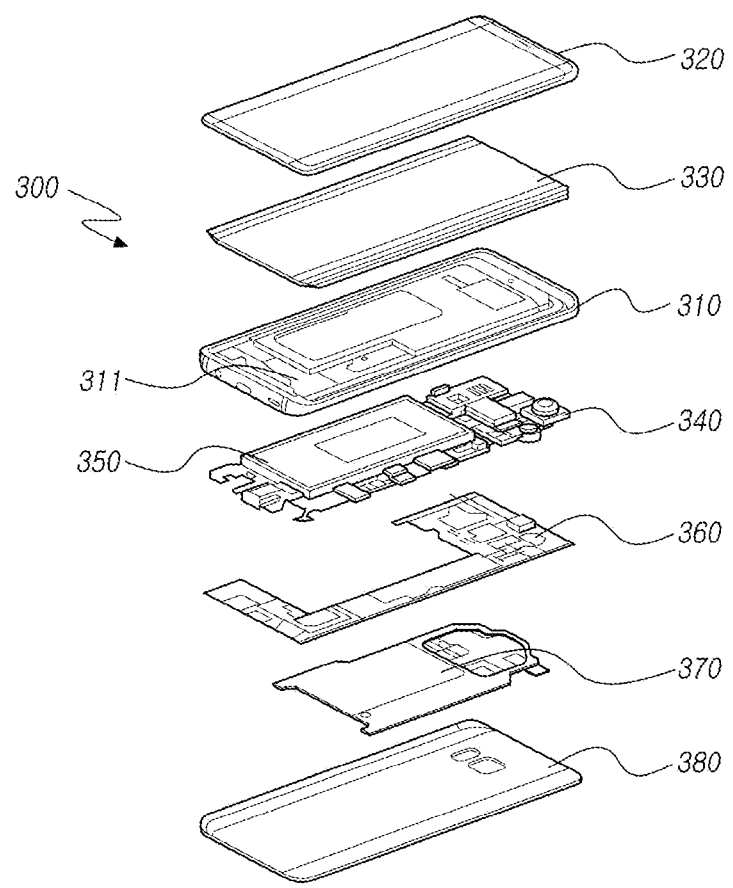
FIG. 3 is an exploded perspective view illustrating an electronic device according to an embodiment of the disclosure.

FIG. 3 is an exploded perspective view illustrating an electronic device (e.g., the electronic device 200 of FIG. 2A) according to an embodiment of the disclosure.

Referring to FIG. 3, an electronic device 300 may include a side bezel structure 310, a first supporting member 311 (e.g., a bracket), a front plate 320, a display 330, a printed circuit board (PCB) 340, a battery 350, a second supporting member 360 (e.g., a rear case), an antenna 370, and a rear plate 380. According to an embodiment, the electronic device 300 may exclude at least one (e.g., the first supporting member 311 or second supporting member 360) of the components or may add other components. At least one of the components of the electronic device 300 may be the same or similar to at least one of the components of the electronic device 101 of FIG. 1 or FIGS. 2A and 2B and no duplicate description is made below.

The first supporting member 311 may be disposed inside the electronic device 300 to be connected with the side bezel structure 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 350 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment, an antenna structure may be formed by a portion or combination of the side bezel structure 310 and/or the first supporting member 311.

Figure 4:
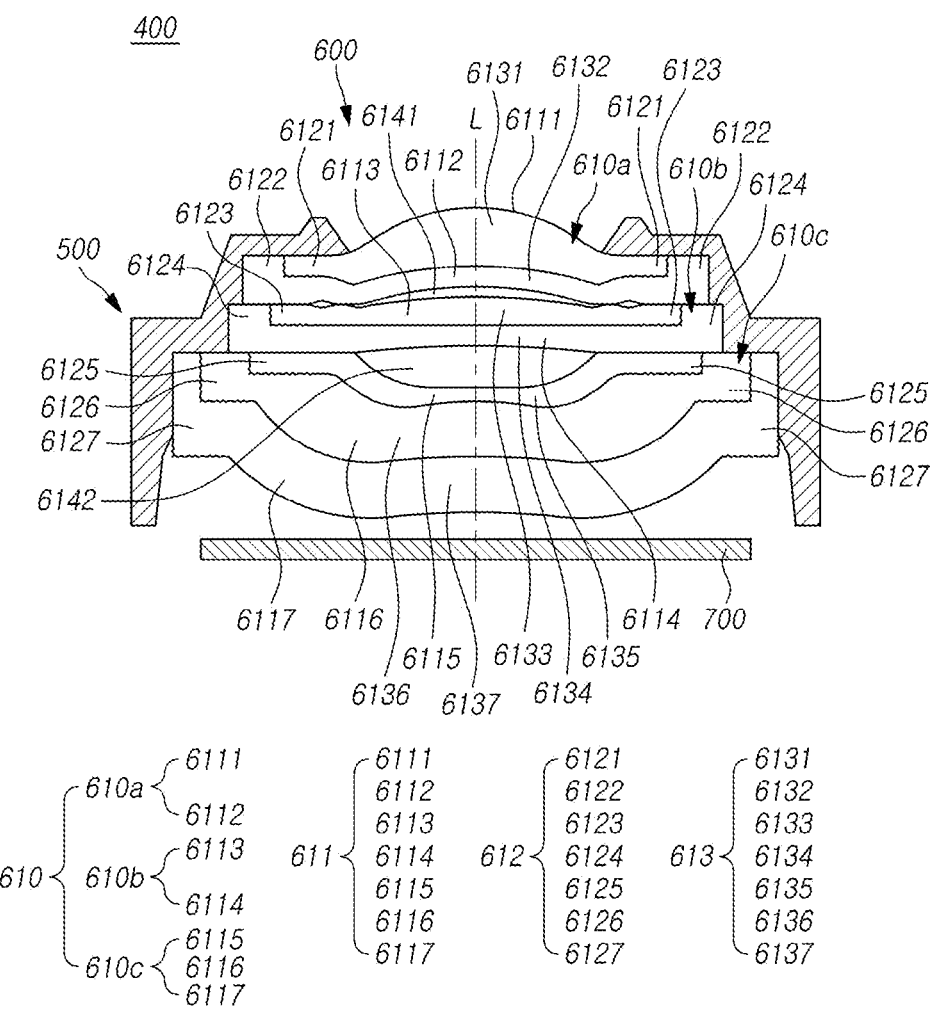
FIG. 4 is a view schematically illustrating a camera module included in an electronic device according to an embodiment of the disclosure.

FIG. 4 is a view schematically illustrating a camera module (e.g., the camera module 180 of FIG. 1) included in an electronic device (e.g., the electronic device 200 of FIG. 2A) according to an embodiment of the disclosure.

Figure 5:
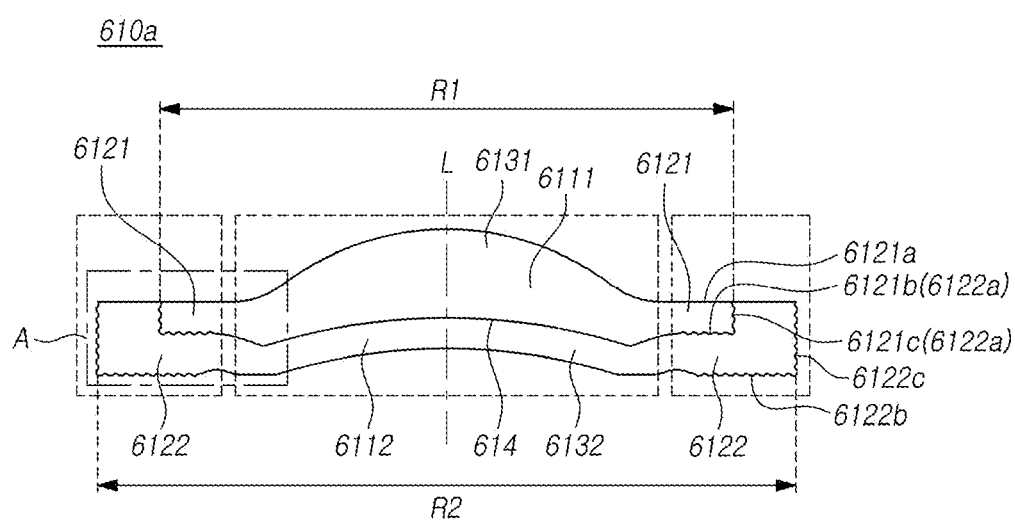
FIG. 5 is a cross-sectional view illustrating a compound lens according to an embodiment of the disclosure.

FIG. 5 is a cross-sectional view illustrating a compound lens (e.g., the compound lens 610 of FIG. 4) according to an embodiment of the disclosure.

Figure 6:
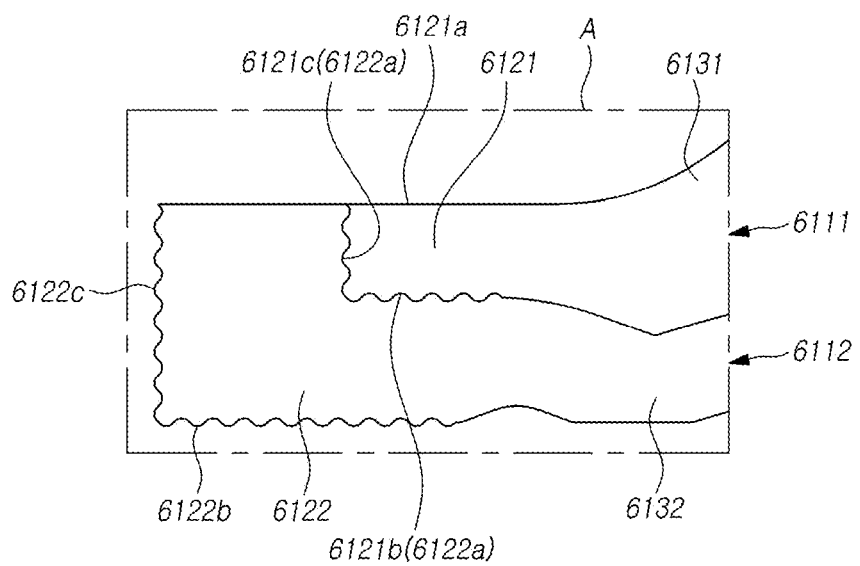
FIG. 6 is an enlarged view of portion A of FIG. 5 according to an embodiment of the disclosure.

FIG. 6 is an enlarged view of portion A of FIG. 5 according to an embodiment of the disclosure.

, the electronic device 200 to which the camera module 400 may be applied may be various types of devices. The electronic device 200 may include, for example, various types of electronic devices, such as a bar type, a foldable type, a rollable type, a sliding type, or a wearable type. The electronic devices 200 may include, for example, a portable communication device (e.g., a smartphone), a computer device (e.g., a tablet personal computer (PC)), a portable multimedia device (e.g., a Bluetooth earphone), a portable medical device, a camera, a wearable device (e.g., a smart watch), or a home appliance. According to an embodiment of the disclosure, the electronic devices 200 are not limited to those described above. In the disclosure, for convenience of description, the electronic device 200 is assumed to be a portable terminal, such as a smartphone, but without limitations thereto, be any kind of electronic device which may come equipped with a camera module or a slight modification thereto.

In the schematic view of the camera module, the thickness, size, or shape of the lens is slightly exaggerated for description purposes. In particular, the spherical or aspheric lens shown as a lens assembly is merely an example, and embodiments of the disclosure are not limited thereto.

Further, in the disclosure, when a component contacts another component, this may mean that the components contact each other directly or indirectly with another component disposed therebetween.

Referring to FIGS. 4, 5 and 6, the camera module 400 may include a lens housing 500, a lens assembly 600, or an image sensor 700. The camera module 400 may be the same as, or similar to, the camera modules 205, 212, or 213 shown in FIG. 2A or 2B. The camera module 400 may be the front camera module 205 or the rear camera module 212 or 213 of the electronic device 200 of FIG. 2A or 2B, but is not limited thereto.

According to an embodiment, the camera module 400 may be disposed to contact the external environment through a designated area in the internal space of the electronic device 200. For example, the designated area is an area where pixels are not disposed on the display panel (e.g., the display 201 of FIG. 2A), but is not limited thereto.

According to an embodiment, the camera module 400 may include a lens housing 500. In an embodiment, the lens housing 500 may provide a space where the lens assembly 600 is seated. The lens assembly 600 may be disposed not to move in the lens housing 500. The lens housing 500 may protect the lens assembly 600 from external impact. The lens housing 500 may be provided to fix the lens assembly 600 for alignment with the optical axis L.

According to an embodiment, the lens assembly 600 may include at least one compound lens 610 in which a plurality of lenses are bonded together. In an embodiment, the lens assembly 600 may include three compound lenses 610. The three compound lenses 610 may include, for example, a first compound lens 610a, a second compound lens 610b, or a third compound lens 610c. The number of the compound lenses 610 provided in the lens assembly 600 may be one, two, or four or more. The compound lenses 610 provided in the lens assembly 600 may be arranged in a row along the optical axis L. The optical axis L may be provided by connecting the centers and focuses of the compound lenses 610 arranged in a row. In an embodiment, the three compound lenses 610 provided in the lens assembly 600, i.e., the first compound lens 610a, the second compound lens 610b, and the third compound lens 610c, may be sequentially arranged along the optical axis L. The first compound lens 610a may have, for example, a first refractive power. The second compound lens 610b may have, for example, a second refractive power. The third compound lens 610c may have, for example, a third refractive power. The first refractive power, the second refractive power, or the third refractive power may be different from each other or partially the same. For example, the first refractive power or the third refractive power is a positive refractive power. For example, the second refractive power is a negative refractive power.

According to an embodiment, the lens assembly 600 may include a plurality of lenses 611. The lens assembly 600 may include, for example, seven lenses. In an embodiment, at least one of a first lens 6111, a second lens 6112, a third lens 6113, a fourth lens 6114, a fifth lens 6115, a sixth lens 6116, or a seventh lens 6117 may be sequentially arranged from a subject side to the image sensor (700) side along the optical axis L. The subject side may refer to an outside of the lens assembly 600 where the subject to be captured is positioned. The image sensor (700) side may refer to an inside of the lens assembly 600. In this case, the light transferred upon capture may sequentially pass through the seven lenses (e.g., the first to seventh lenses 6111, 6112, 6113, 6114, 6115, 6116, and 6117) and be transferred to the image sensor 700. The image sensor 700 may detect subject information by the light transferred through the lenses (e.g., the first to seventh lenses 6111, 6112, 6113, 6114, 6115, 6116, and 6117) and convert it into an electrical signal.

According to an embodiment, the lens assembly 600 may include at least one aspheric lens or at least one spherical lens. In an embodiment, at least one lens (e.g., the fourth lens 6114) among the plurality of lenses constituting the lens assembly 600 may be an aspheric lens, and the remaining lenses (first to third lenses 6111, 6112, and 6113 or the fifth to seventh lenses 6115, 6116, and 6117) may be spherical lenses.

According to an embodiment, the lens 611 may be a plastic lens, but is not limited thereto. According to an embodiment, the lens 611 may be manufactured by injection molding, but is not limited thereby.

In an embodiment, the lens assembly 600 may include a first compound lens 610*a*, a second compound lens 610*b*, or a third compound lens 610*c*. The first compound lens 610*a* may be formed by bonding one surface (e.g., lower surface) of the first lens 6111 and one surface (e.g., upper surface) of the second lens 6112 to each other. The first lens 6111 may be bonded face to face with the second lens 6112, for example. The second compound lens 610*b* may be configured by bonding the third lens 6113 and the fourth lens 6114 to each other. The third lens 6113 and the fourth lens 6114 may be bonded face to face, for example. The third compound lens 610*c* included in the lens assembly 600 may be configured by bonding the fifth lens 6115, the sixth lens 6116, and the seventh lens 6117 to each other. The fifth lens 6115, the sixth lens 6116, and the seventh lens 6117 may be bonded face to face, for example.

According to an embodiment, air layers 6141 and 6142 may exist between the compound lenses in the lens assembly 600. A first air layer 6141 may be provided, for example, in a partial area between the lower portion of the first compound lens 610*a* and the upper portion of the second compound lens 610*b*. For example, a second air layer 6142 is provided in a partial area between the lower portion of the second compound lens 610*b* and the upper portion of the third compound lens 610*c*. The first air layer 6141 may have a thickness, width, or area different from that of the second air layer 1642. The first air layer 6141 may have a relatively small thickness as compared to, for example, the second air layer 6142. The first air layer 6141 may have a relatively small width as compared with, for example, the second air layer 6142. The first air layer 6141 may have a relatively small area as compared with, for example, the second air layer 6142.

In an embodiment, the compound lens 610 may be configured by bonding two or three lenses, but may not be limited thereto. In an embodiment, the compound lens 610 may be configured by bonding four or more lenses. To manufacture the camera module 400, the manufacturing process may be simplified by minimizing the number of lenses constituting the compound lens 610.

According to an embodiment, the lens 611 may include a flange 612. The flange 612 may be positioned on an outer portion of the lens 611, for example. The flange 612 may be provided, for example, near an outer edge of the lens 611.

According to an embodiment, the lens 611 may include a light transmitting portion 613. The light transmitting portion 613 may be disposed inside the flange 612. The light transmitting portion 613 may be a portion through which light is transmitted to observe the target thing or target object (e.g., subject) to be captured. The light transmitting portion 613 may have, for example, a spherical or aspheric shape. The light transmitting portion 613 may have a convex shape to collect light or a concave shape to disperse light. In an embodiment, the light transmitting portion 613 may include first to seventh light transmitting portions 6131, 6132, 6133, 6134, 6135, 6136, and 6137 provided in the first to seventh lenses 6111, 6112, 6113, 6114, 6115, 6116, and 6117.

In an embodiment, the first lens 6111 may include a first flange 6121. The first lens 6111 may have a first light transmitting portion 6131 formed inside the first flange 6121. The second lens 6112 may include a second flange 6122. The second lens 6112 may have a second light transmitting portion 6132 formed inside the second flange 6122. The third lens 6113 may include a third flange 6123. The third lens 6113 may have a third light transmitting portion 6133 formed inside the third flange 6123. The fourth lens 6114 may include a fourth flange 6124. The fourth lens 6114 may have a fourth light transmitting portion 6134 formed inside the fourth flange 6124. The fifth lens 6115 may include a fifth flange 6125. The fifth lens 6115 may have a fifth light transmitting portion 6135 formed inside the fifth flange 6125. The sixth lens 6116 may include a sixth flange 6126. The sixth lens 6116 may have a sixth light transmitting portion 6136 formed inside the sixth flange 6126. The seventh lens 6117 may include a seventh flange 6127. The seventh lens 6117 may have a seventh light transmitting portion 6137 formed inside the seventh flange 6127. According to an embodiment, the flange 612 may be omitted from at least one of the first lens 6111 to the seventh lens 6117. The lens without the flange 612 may be composed of the spherical or aspheric light transmitting portion alone.

According to an embodiment, among at least one of a plurality of surfaces of the flange 612, at least one entire surface or at least a portion of at least one surface may be a roughened surface. In an embodiment, one or more of the surfaces of the flange 612 may be overall roughened, or at least a portion of each of one or more surfaces may be roughened. In an embodiment, in the flange 612, one entire surface among the surfaces may be roughened. In an embodiment, at least a portion of one of the surfaces of the flange 612 may be roughened. In an embodiment, two or more of the surfaces of the flange 612 may be overall roughened. In an embodiment, at least a portion of each of two or more of the surfaces of the flange 612 may be roughened. In an embodiment, the entirety of at least one of the surfaces and at least a portion of at least one surface of the flange 612 may be roughened.

According to an embodiment, the first flange 6121 provided in the first lens 6111 may include an upper surface 6121*a*, a lower surface 6121*b*, or a side surface 6121*c*. In the first flange 6121, for example, at least one surface (e.g., the lower surface 6121*b* and/or side surface 6121*c*) among the upper surface 6121*a*, lower surface 6121*b*, or side surface 6121*c* may be roughened. In the first flange 6121, for example, a portion of the upper surface 6121*a*, the lower surface 6121*b*, or the side surface 6121*c* may be roughened. The upper surface 6121*a* of the first flange 6121 may be a surface positioned toward the subject, and the lower surface 6121*b* of the first flange 6121 may be a surface positioned toward the image sensor 700, as opposite to the subject. The side surface 6121*c* of the first flange 6121 may be a surface connecting the upper surface 6121*a* and the lower surface 6121*b*. For example, the side surface 6121*c* of the first flange 6121 forms an outer circumferential surface of the first lens 6111.

The structure of the first flange 6121 described above may be the same as those of some lenses 6113 and 6115 of the lens assembly 600 or a slight modification may be made thereto. Some lenses 6113 and 6115 to which the structure of the first flange 6121 is likewise applicable may correspond to the uppermost lens of the compound lens 610. The lenses 6113 and 6115 may be, for example, the third lens 6113 which is provided at the top of the second compound lens 610*b* or the fifth lens 6115 which is provided at the top of the third compound lens 610*c*.

According to an embodiment, the second flange 6122 provided in the second lens 6112 may include an upper surface 6122*a*, a lower surface 6122*b*, or a side surface 6122*c*. The upper surface 6122*a* of the second flange 6122 may be provided to face the lower surface 6121*b* and/or side surface 6121*c* of the first flange 6121. In an embodiment, a portion of the upper surface 6122*a* of the second flange 6122, facing the roughened lower surface 6121*b* or side surface 6121*c* of the first flange 6121, may be roughened. The upper surface 6122*a* of the second flange 6122 may be a surface facing the lower surface 6121*b* of the first flange 6121, and the lower surface 6122*b* of the second flange 6122 may be a surface positioned toward the image sensor 700, as opposite to the first flange 6121. The side surface 6122*c* of the second flange 6122 may be a surface connecting the upper surface 6122*a* and the lower surface 6122*b*. For example, the side surface 6122*c* of the second flange 6122 forms an outer circumferential surface of the second lens 6112. In an embodiment, the side surface 6122*c* of the second flange 6122 may be roughened.

The structure of the second flange 6122 described above may be the same as those of some lenses 6114, 6116, and 6117 of the lens assembly 600 or a slight modification may be made thereto. Some lenses 6114, 6116, and 6117 to which the structure of the second flange 6122 is likewise applicable may correspond to an intermediate or lowermost lens of the compound lens 610. The lenses 6114, 6116, and 6117 may be, for example, the fourth lens 6114 provided at the bottom of the second compound lens 610*b* or the sixth lens 6116 or seventh lens 6117 provided at the middle or bottom of the third compound lens 610*c*.

According to an embodiment, a portion of the flange 612, contacting another adjacent flange 612, may be roughened. The ghost phenomenon may be prevented even without disposing a separate spacer between the lenses by roughening between the lenses 611 upon processing the compound lens 610. As no separate spacer for preventing internal reflection between heterogeneous lenses 611 is configured, it is possible to simplify the manufacturing process and save manufacturing costs.

According to an embodiment, the camera module 400 may include an image sensor 700. The image sensor 700 is a sensor mounted on a circuit board and disposed in alignment with the optical axis of the lens assembly 600 and may react to light. The image sensor 700 is a semiconductor that converts the light obtained through the lens assembly 600 into a digital signal and may be a solid image sensor, such as a charge-coupled device (CCD) or a complementary metal-oxide semiconductor (CMOS). The image sensor 700, however, is not limited thereto but may rather include various elements that convert light, for example, an image of the subject, into an electrical image signal. The image sensor 700 may detect brightness, contrast ratio information, or color information about the subject from the light which has been transmitted through the lens assembly 600, thereby obtaining an image for the object.

According to an embodiment, the image data obtained by the image sensor 700 may be transferred to the processor (e.g., the processor 120 of FIG. 1). The image sensor 700 may be disposed to operate on a circuit board (e.g., the printed circuit board 340 of FIG. 3) provided in the electronic device 200, for example. The circuit board 340 may include a flexible printed circuit board (FPCB).

According to an embodiment, the camera module 400 may include an optical filter (not shown). The optical filter may include at least one of a low pass filter, an infrared (IR) cut filter, or a cover glass. For example, the infrared cut filter transmits wavelengths in a visible light band and reduce or block wavelengths in an infrared band. The optical filter may be disposed, for example, between the lens assembly 600 and the image sensor 700. The optical filter may be disposed, for example, between the compound lenses 610. In an embodiment, a space for disposing the optical filter may be provided between the compound lenses 610.

According to an embodiment, the camera module 400 may include an aperture (not shown). According to an embodiment, the amount of light reaching the image sensor 700 may be adjusted by adjusting the size of the aperture.

The compound lens shown in FIGS. 5 and 6 may be the same as or similar to the first compound lens 610*a* shown in FIG. 4. FIGS. 5 and 6 are example views for a detailed description of the disclosure. Therefore, the following description of the compound lens 610*a* may also be applicable to compound lenses composed of a combination of lenses having various shapes or refractive indexes. Further, the following description of the compound lens 610*a* may also be applicable to compound lenses having three or more lenses bonded together. The technical features as proposed in relation to the compound lens 610*a* described below may also be applied to other compound lenses (e.g., the second compound lens 610*b* or third compound lens 610*c* of FIG. 4) of the lens assembly 600 or an obvious modification may be made thereto.

According to an embodiment, two lenses 6111 and 6112 (e.g., the first lens 6111 and second lens 6112 of FIG. 4) adjacent in the compound lens 610*a* may have different refractive indexes. According to an embodiment, one of the two lenses 6111 and 6112 adjacent to each other in the compound lens 610*a* may have positive refractive power, and the other may have negative refractive power.

According to an embodiment, the compound lenses 610 (e.g., the first compound lens 610*a*, the second compound lens 610*b*, and the third compound lens 610*c* of FIG. 4) included in the lens assembly 600 may have different diameters. The diameter may be defined by the largest or smallest diameter, for example, when the compound lens is not a perfect circle in shape. In this case, the definition of the diameter should be likewise applied to all the compound lenses 610. In an embodiment, among the first compound lens 610*a*, the second compound lens 610*b*, or the third compound lens 610*c* arranged in a row along the optical axis L, the compound lens disposed on the subject side may have a relatively small diameter as compared with the compound lens disposed on the image sensor (700) side. As an example, the first compound lens 610*a* disposed on the subject side has a smaller diameter than that of the second compound lens 610*b* disposed on the image sensor (700) side. As an example, the second compound lens 610*b* disposed on the subject side has a smaller diameter than that of the third compound lens 610*c* disposed on the image sensor (700) side.

According to an embodiment, the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610*a*, second compound lens 610*b*, or third compound lens 610*c* of FIG. 4) may have different diameters. The diameter may be defined by the largest or smallest diameter, for example, when the lens is not a perfect circle in shape. In this case, the definition of the diameter should be likewise applied to all the lenses (e.g., the first lens 6111 to the seventh lens 6117). For example, the lenses (e.g., the first lens 6111 and the second lens 6112 of FIG. 4) constituting one compound lens (e.g., the first compound lens 610a of FIG. 4) have different diameters. In an embodiment, the diameter of the first lens (e.g., the first lens 6111 of FIG. 4) may be smaller than the diameter of the second lens (e.g., the second lens 6112 of FIG. 4), but is not limited thereto. For example, the two adjacent lenses for forming one compound lens have the same diameter. In an embodiment, in the manufacturing process (e.g., injection molding), the diameter of the first lens (e.g., the first lens 6111 of FIG. 4) first prepared may be smaller than the diameter of the second lens (e.g., the second lens 6112 of FIG. 4) prepared later, but is not limited thereto. In an embodiment, of the first lens 6111 or the second lens 6112 constituting the first compound lens 610a disposed in a row along the optical axis L, the lens disposed on the subject side may have a relatively small diameter as compared with the lens disposed on the image sensor (700) side. As an example, the first lens 6111 disposed on the subject side has a relatively small diameter as compared with the second lens 6112 disposed on the image sensor (700) side.

According to an embodiment, among the lenses (e.g., the first and second lenses 6111 and 6112, or the third and fourth lenses 6113 and 6114, or the fifth, sixth, and seventh lenses 6115, 6116, and 6117 of FIG. 4) constituting each of the compound lenses 610 (e.g., the first compound lens 610a, second compound lens 610b, or third compound lens 610c of FIG. 4), a lens (e.g., the first lens 6111, third lens 6113, or fifth lens 6115) having a small diameter may be mounted in a receiving space provided in a lens (e.g., the second lens 6112, fourth lens 6114, or sixth lens 6116 of FIG. 4) having a relatively large diameter. In this case, the outer circumferential surface of the lens (e.g., the first lens 6111, third lens 6113, or fifth lens 6115 of FIG. 4) having the small diameter may be surrounded by the rounded edge of the lens (e.g., the second lens 6112, fourth lens 6114, or sixth lens 6116 of FIG. 4) having the relatively large diameter.

In an embodiment, among the lenses (e.g., the first lens 6111 and second lens 6112 of FIG. 4) constituting one compound lens (e.g., the first compound lens 610a of FIG. 4), the lens (e.g., the second lens 6112 of FIG. 4) having the relatively large diameter may surround the outer circumferential surface of the lens (e.g., the first lens 6111 of FIG. 4) having a relatively small diameter. In an embodiment, the second lens 6112 having a larger diameter may surround the outer circumferential surface (e.g., the side surface 6121c of the first flange (e.g., the first flange 6121 of FIG. 4)) of the first lens 6111 having a smaller diameter. In this case, the first lens 6111 may be mechanically secure-coupled to the second lens 6112. This may prevent misalignment of the first lens 6111 or second lens 6112 from the optical axis although external impact or vibration is applied to the first compound lens 610a.

According to an embodiment, all or some of the facing surfaces between the flanges 612 (e.g., the first flange 6121 to seventh flange 6127 of FIG. 4) of the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610a, second compound lens 610b, or third compound lens 610c of FIG. 4) may be roughened.

In an embodiment, all or some of the facing surfaces of the first flange 6121 of the first lens 6111 and the second flange 6122 of the second lens 6112 constituting the first compound lens 610a may be roughened surfaces. The roughened surface may be formed so that a plurality of protrusions and recesses are alternately arranged. In an embodiment, the roughened surface may have a regular pattern. In an embodiment, the rough surface may have an irregular pattern. In an embodiment, the roughened surface may have a mixed pattern of a regular pattern and an irregular pattern. The pattern of the roughened surface is not limited thereto.

According to an embodiment, all or some of the side surfaces of the flanges 612 (e.g., the first flange 6121 to seventh flange 6127 of FIG. 4) of the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610a, second compound lens 610b, or third compound lens 610c of FIG. 4) may be roughened.

In an embodiment, all or some of the side surfaces of the first flange 6121 of the first lens 6111 or the second flange 6122 of the second lens 6112 constituting the first compound lens 610a may be roughened surfaces. The roughened surface may be formed so that a plurality of protrusions and recesses are alternately arranged. In an embodiment, the roughened surface may have a regular pattern. In an embodiment, the rough surface may have an irregular pattern. In an embodiment, the roughened surface may have a mixed pattern of a regular pattern and an irregular pattern. The pattern of the roughened surface is not limited thereto.

According to an embodiment, a roughened surface having a first surface roughness may be provided on the facing surfaces between the flanges 612 (e.g., the first flange 6121 to seventh flange 6127 of FIG. 4) of the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610a, second compound lens 610b, or third compound lens 610c of FIG. 4).

In an embodiment, the lower surface 6121b of the first flange 6121 in the first lens 6111 and/or the upper surface 6122a of the second flange 6122 in the second lens 6112 may include a roughened surface having the first surface roughness. The lower surface 6121b of the first flange 6121 may be a surface facing the upper surface 6122a of the second flange 6122.

According to an embodiment, a roughened surface having a second surface roughness may be provided on the side surfaces of the flanges 612 (e.g., the first flange 6121 to seventh flange 6127 of FIG. 4) of the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610a, second compound lens 610b, or third compound lens 610c of FIG. 4).

In an embodiment, the side surface 6121c of the first flange 6121 in the first lens 6111 and/or the upper surface 6122a of the second flange 6122 in the second lens 6112 may include a roughened surface having the second surface roughness. The upper surface 6122a of the second flange 6122 may be a surface facing the side surface 6121c of the first flange 6121.

According to an embodiment, the roughened surfaces provided in the flanges 612 (e.g., the first flange 6121 to seventh flange 6127 of FIG. 4) of the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610a, second compound lens 610b, or third compound lens 610c of FIG. 4) may have different surface roughnesses. In an embodiment, the first surface roughness of the roughened surface provided on the facing surfaces between the flanges 612 may be different from the second surface roughness of the rough surface provided on the side surface of each of the flanges 612. For example, the second surface roughness is smaller than the first surface roughness. This may prevent damage to the roughened surface provided on the side surface (e.g., the side surface 6121c of the first flange 6121 or the side surface 6122c of the second flange 6122 in FIG. 5) when removing the lens 611 (e.g., the first to seventh lenses 6111, 6112, 6113, 6114, 6115, 6116, and 6117 of FIG. 4) from the molds in injection molding. The first surface roughness may have, for example, 0.05 to 10 μm arithmetic mean roughness. The second surface roughness may have, for example, 1 μm or less arithmetic mean roughness.

According to an embodiment, larger roughness (surface roughness) may be imparted to the side surface (e.g., the side surface 6121c of the first flange 6121 or the side surface 6122c of the second flange 6122 in FIG. 5) of the flange 612 in the lens 611 (e.g., the first to seventh lenses 6111, 6112, 6113, 6114, 6115, 6116, and 6117 of FIG. 4) through an additional process after the removing process. In an embodiment, the second surface roughness of the surface provided on the side surface 6121c of the first flange 6121 or the side surface 6122c of the second flange 6122 may be increased through an additional process, such as corrosion, electric discharge, blasting, or laser after removing. The surface roughness of the roughened surfaces provided on the side surfaces of the other flanges (third flange 6123 to seventh flange 6127) may also be increased through an additional process after removing.

According to an embodiment, larger roughness (surface roughness) may be imparted to the whole or part of a surface (e.g., the lower surface 6121b of the first flange 6121 or the lower surface 6122b of the second flange 6122) of the flange 612 in the lens 611 (e.g., the first to seventh lenses 6111, 6112, 6113, 6114, 6115, 6116, and 6117 of FIG. 4), facing the flange of another lens, through an additional process after the removing process. In an embodiment, the first surface roughness of the roughened surface provided on the lower surface 6121b of the first flange 6121 or the lower surface 6122b of the second flange 6122 may be increased through an additional process, such as corrosion, electric discharge, blasting, or laser after removing. The surface roughness of the roughened surfaces provided on the lower surfaces of the other flanges (third flange 6123 to seventh flange 6127) may also be increased through an additional process after removing.

At least a portion of the facing surfaces of the flanges of the lenses 611 constituting the compound lens 610 may be a roughened surface. The roughened surface may increase the bonding area of the lenses 611 constituting the compound lens 610, enhancing the bonding strength. The roughened surface may also play a role as a light blocking layer to prevent internal reflection between lenses having different refractive indexes. The roughened surface may prevent misalignment of the lenses 611 from the optical axis L due to external impact.

According to an embodiment, the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610a, second compound lens 610b, or third compound lens 610c of FIG. 4) may be bonded so that the light transmitting portions (e.g., the first and second light transmitting portions 6131 and 6132, or the third and fourth light transmitting portions 6133 and 6134, or the fifth, sixth, and seventh light transmitting portions 6135, 6136, and 6137 of FIG. 4) contact each other.

In an embodiment, no air layer (or blank layer) may be formed between the first light transmitting portion 6131 of the first lens 6111 and the second light transmitting portion 6132 of the second lens 6112. In an embodiment, no air layer (or blank layer) may be formed between the third light transmitting portion 6133 of the third lens 6113 and the fourth light transmitting portion 6134 of the fourth lens 6114. In an embodiment, no air layer (or blank layer) may be formed between the fifth light transmitting portion 6135 of the fifth lens 6115 and the sixth light transmitting portion 6136 of the sixth lens 6116. In an embodiment, no air layer (or blank layer) may be formed between the sixth light transmitting portion 6136 of the sixth lens 6116 and the seventh light transmitting portion 6137 of the seventh lens 6117.

According to an embodiment, the compound lens 610 of the disclosure may have no intermediate air layer (or a blank layer). Accordingly, when various types of compound lenses 610 are disposed in the lens housing (e.g., the lens housing 500 of FIG. 4), an air layer (e.g., the air layer 6141 or 6142 of FIG. 4) may be formed only between the compound lenses 610, minimizing the number and thickness of the air layers. As a result, it is possible to minimize the height of the lens assembly (e.g., the lens assembly 600 of FIG. 4).

More lenses are required to enhance the performance of the camera module (e.g., the camera module 400 of FIG. 4) disposed in the electronic device (e.g., the electronic device 200 of FIG. 2A). However, the internal space of the electronic device 200 is limited. The disclosure may minimize the area of the inter-lens air layer, thereby allowing more lenses to be placed in the limited space.

According to an embodiment, adjacent lenses among the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610a, second compound lens 610b, or third compound lens 610c of FIG. 4) may have different glass transition temperatures.

In an embodiment, the first lens 6111 and second lens 6112 adjacent to each other may have different glass transition temperatures. The glass transition temperature of the first lens 6111 may be higher than the glass transition temperature of the second lens 6112. For example, if the glass transition temperature of the first lens 6111 is 155° C. to 165° C., the glass transition temperature of the second lens 6112 is 135° C. to 145° C.

In an embodiment, the third lens 6113 and fourth lens 6114 adjacent to each other may have different glass transition temperatures. The glass transition temperature of the third lens 6113 may be higher than the glass transition temperature of the fourth lens 6114. For example, if the glass transition temperature of the third lens 6113 is 155° C. to 165° C., the glass transition temperature of the fourth lens 6114 is 135° C. to 145° C.

In an embodiment, the fifth lens 6115, the sixth lens 6116, and the seventh lens 6117 adjacent to each other may have different glass transition temperatures. The glass transition temperature of the fifth lens 6115 may be higher than that of the sixth lens 6116. The glass transition temperature of the sixth lens 6116 may be higher than the glass transition temperature of the seventh lens 6117. For example, if the glass transition temperature of the fifth lens 6115 is 155° C.

to 165° C., the glass transition temperature of the sixth lens 6116 is 135° C. to 145° C. The glass transition temperature of the seventh lens 6117 may be 115° C. to 125° C.

According to an embodiment, to manufacture the compound lens 610, the lens manufactured first (e.g., the first lens 6111, the third lens 6113 or the fifth lens 6115) may have a higher glass transition temperature than the lens manufactured later (e.g., the second lens 6112, the fourth lens 6115, the sixth lens 6116, or the seventh lens 6117).

The compound lens 610 may be manufactured by injection molding. In the injection molding process, for example, a lens (e.g., the first lens 6111, the third lens 6113, or the fifth lens 6115) may be firstly injection-molded by a first mold. Thereafter, the lens (e.g., the first lens 6111, the third lens 6113, or the fifth lens 6115) may be placed in a second mold, secondly injection-molding a lens (e.g., the second lens 6112, the fourth lens 6114, or the seventh lens 6117). In this case, the glass transition temperature of the first-formed lens (e.g., the first lens 6111, third lens 6113, or fifth lens 6115) may be higher than the later-formed lens (e.g., the second lens 6112, fourth lens 6114, or sixth lens 6116) to prevent a change in refractive index or deformation of the lens (e.g., the first lens 6111, third lens 6113, or fifth lens 6115) placed in the second mold.

According to an embodiment, among the lenses (e.g., the first and second lenses 6111 and 6112, or the third and fourth lenses 6113 and 6114, or the fifth, sixth and seventh lenses 6115, 6116, and 6117 of FIG. 4) constituting each of the compound lenses 610 (e.g., the first compound lens 610a, second compound lens 610b, or third compound lens 610c of FIG. 4), at least one lens may include a coating portion 614 that is surface-coated.

In an embodiment, the coating portion 614 may be an anti-reflective (AR) coating. The coating portion 614 may have a component, such as, for example, $SiO_2$, $Ti_3O_5$, or $MgF_2$. The coating portion 614 may be coated by deposition on the lens 611 by applying electric energy in a vacuum device, but is not limited thereto. The coating portion 614 may have a thickness of, for example, 100 nm to 700 nm. By coating the surface of the lens 611 with the coating portion 614, it is possible to prevent light reflection on the surface of the lens 611 to reduce loss of light passing through the compound lens 610.

Figure 7:
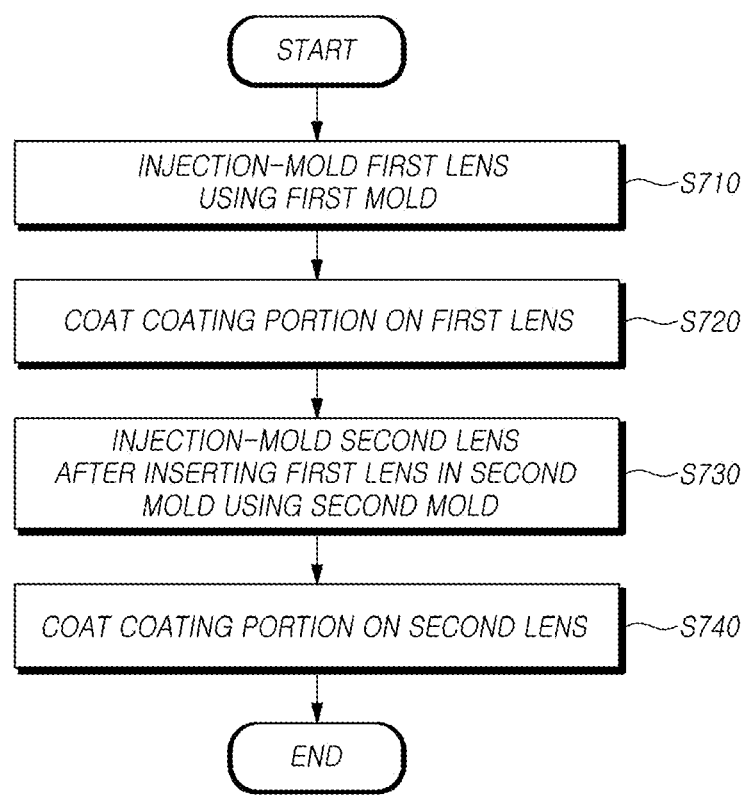
FIG. 7 is a flowchart illustrating a process for manufacturing a compound lens according to an embodiment of the disclosure.

FIG. 7 is a flowchart illustrating a process for manufacturing a compound lens (e.g., the compound lens 610 of FIG. 4) according to an embodiment of the disclosure.

Referring to FIG. 7, according to an embodiment, a method for manufacturing a compound lens 610 (e.g., the first compound lens 610a) may include injecting a molten polymer material into a first mold to injection-mold a first lens (e.g., the first lens 6111 of FIG. 5) at operation 5710. The first mold may be a mold prepared considering the shape of, for example, the first lens 6111. In an embodiment, a pattern resultant from roughening may be formed on a forming surface of a first flange (e.g., the first flange 6121 of FIG. 5) among the forming surfaces of the first lens 6111 injection-molded by the first mold. The pattern for roughening may be, for example, a pattern in which protrusions and recesses are regularly or irregularly repeated.

According to an embodiment, the method for manufacturing the compound lens 610 (e.g., the first compound lens 610a) may include coating the surface of the removed first lens 6111 with a coating material at operation 5720. In this case, a coating portion (e.g., the coating portion 614 of FIG. 5) may be formed on the surface of the first lens 6111. In an embodiment, the coating portion 614 may be formed by applying a coating material to the surface of the first lens 6111 and applying electric energy in a vacuum device for deposition. This process may be omitted.

According to an embodiment, the method for manufacturing the compound lens 610 (e.g., the first compound lens 610a) may include attaching or inserting the first lens 6111 in a second mold and putting a molten polymer material in an empty space prepared in the second mold to injection-mold a second lens (e.g., the second lens 6112 of FIG. 5) at operation 5730. The second mold may be a mold prepared considering the shape of, for example, the first lens 6111 and the second lens 6112. The compound lens 610 injection-molded by the second mold may be manufactured in such a form that the first lens 6111 and the second lens 6112 are bonded to each other. In an embodiment, a portion of the second flange (e.g., the second flange 6122 of FIG. 5) of the second lens 6112, contacting (or facing) the first flange 6121, may have a roughened surface formed due to the rough surface of the first flange 6121 which has been roughened in advance. The outer portion of the second flange 6122 may be roughened by a pattern in which protrusions or recesses prepared in the portion corresponding to the second mold are regularly or irregularly repeated.

According to an embodiment, the method for manufacturing the compound lens 610 may include coating the whole or part of the surface of the compound lens 610a, in which the first lens 6111 and the second lens 6112 are bonded and which is removed, with a coating material at operation 5740. In this case, a coating portion (e.g., the coating portion 614 of FIG. 5) may be formed on the surface of the second lens 6112. In an embodiment, as the whole or part of the surface of the compound lens 610a is coated with the coating material, the coating material may be applied to the surface of the second lens 6112 and is deposited by applying electric energy in the vacuum device. This process may be omitted. Meanwhile, due to the coating portion 614 previously provided in the first lens 6111, a coating portion (e.g., the coating portion 614 of FIG. 5) may also be provided between the first lens 6111 and the second lens (e.g., the second lens 6112 of FIG. 5).

According to an embodiment, when a third lens is additionally bonded to the compound lens 610a in which the first lens 6111 and the second lens 6112 are bonded, the process of inserting the compound lens 610a in which the first lens 6111 and the second lens 6112 are bonded in a third mold and then injection-molding a molten polymer material to form a third lens in an empty space (receiving space) provided in the third mold to perform injection-molding may be added.

In the embodiments of FIGS. 8 to 12, the compound lens (e.g., the compound lens 610 of FIG. 4) may include light transmitting portions (e.g., the light transmitting portion 613 of FIG. 4) in various shapes. In an embodiment, the light transmitting portion 613 may be an aspheric surface or spherical surface. In an embodiment, the light transmitting portion 613 may be a concave lens or a convex lens. Although FIGS. 8 to 12 illustrate an example in which the compound lens 610 is composed of two or three lenses, this is for convenience of description. In an embodiment, the compound lens 610 may be formed by bonding four or more lenses.

Figure 8:
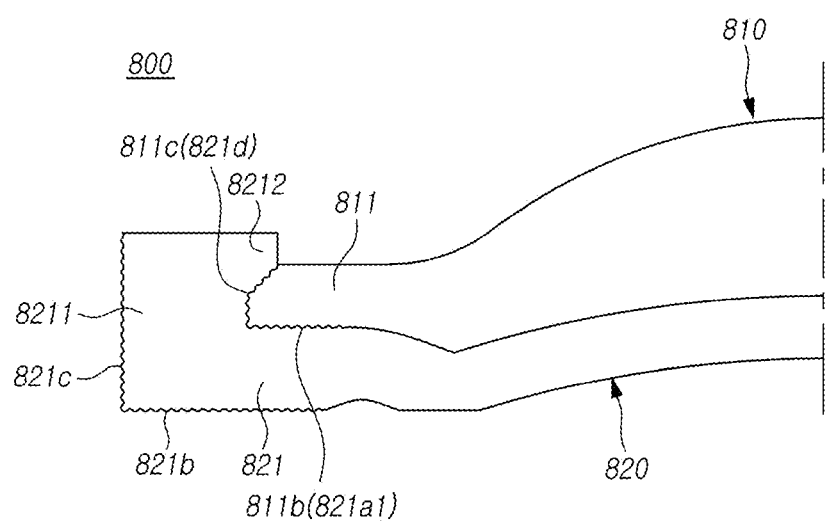
FIG. 8 is a cross-sectional view illustrating a compound lens according to an embodiment of the disclosure.

FIG. 8 is a cross-sectional view illustrating a compound lens (e.g., the compound lens 610 of FIG. 4) according to an embodiment of the disclosure.

Referring to FIG. 8, according to an embodiment, a compound lens 800 may have a structure in which two lenses 810 and 820 are adjacently bonded to each other. The adjacently bonded structure may be, for example, a structure in which two opposite side surfaces of the first lens 810 contact to face the upper inner surface of the second lens 820, and the lower surface of the first lens 810 contacts to face the inner upper surface of the second lens 820. The inner upper surface of the second lens 820 may correspond to the upper surface of the edge (e.g., second flange 821) formed along the circumference of the second lens 820.

According to an embodiment, of the two lenses 810 and 820 constituting the compound lens 800, the second lens 820 may have a structure forcibly constraining the first lens 810 mechanically. The first lens 810 may be mechanically constrained by the second flange 821 of the second lens 820, for example. In an embodiment, of the two lenses 810 and 820 constituting the compound lens 800, the second lens 820 may be formed to surround the outer circumferential surface and the upper surface circumference of the first lens 810. The upper surface circumference of the first lens 810 may be partially surrounded by, for example, the second lens 820.

According to an embodiment, the second flange 821 of the second lens 820 may include a first extension 8211 extending to surround the outer circumferential surface of the first lens 810 in an outer portion thereof. The second flange 821 may include a second extension 8212 extending to surround the upper surface circumference of the first flange 811 of the first lens 810 from an end of the first extension 8211. The second extension 8212 included in the second flange 821 may surround, for example, a portion of the upper surface circumference of the first flange 811. In this case, the second lens 820 may forcibly constrain the first lens 810 mechanically. Therefore, the first lens 810 and the second lens 820 may remain aligned with the optical axis despite external impact or vibration.

According to an embodiment, the first flange 811 may include first roughened surfaces 811*b* and 811*c*. The first roughened surfaces 811*b* and 811*c* may be provided on a partial surface of the first flange 811. In an embodiment, the first roughened surfaces 811*b* and 811*c* may include a roughened surface 811*b* provided on a lower surface of the first flange 811 or a roughened surface 811*c* provided on a side surface, but are not limited thereto.

According to an embodiment, the second flange 821 may include second roughened surfaces 821*a*, 821*b*, 821*c*, and 821*d*. The second roughened surfaces 821*a*, 821*b*, 821*c*, and 821*d* may be provided on a partial surface of the second flange 821. In an embodiment, the second roughened surfaces may include a roughened surface 821*a* provided on an inner upper surface of the second flange 821, a roughened surface 821*d* provided on an inner side surface, a roughened surface 821*b* provided on a lower surface, or a roughened surface 821*c* provided on an outer side surface, but are not limited thereto.

According to an embodiment, the whole or part of the contacting or facing surfaces of the first flange 811 and the second flange 821 may include roughened surfaces 811*b* (821*a*1) and 811*c* (821*d*). In an embodiment, the first roughened surfaces 811*b* and 811*c* provided on the first flange 811 may be disposed to face the second roughened surfaces 821*a*1 and 821*d* provided on the second flange 821. In an embodiment, the second roughened surfaces 821*a*1 and 821*d* provided on the second flange 821 may be disposed to face the first roughened surfaces 811*b* and 811*c* provided on the first flange 811.

According to an embodiment, the first surface roughness of the roughened surface 811*b* (821*a*1) provided on the upper or lower surface of the first flange 811 or second flange 821 may be larger than the second surface roughness of the roughened surface 811*c* (821*d*) provided on the side surface of the first flange 811 or second flange 821. The first surface roughness may have, for example, 0.05 to 10 μm arithmetic mean roughness. The second surface roughness may have, for example, 1 μm or less arithmetic mean roughness.

Figure 9:
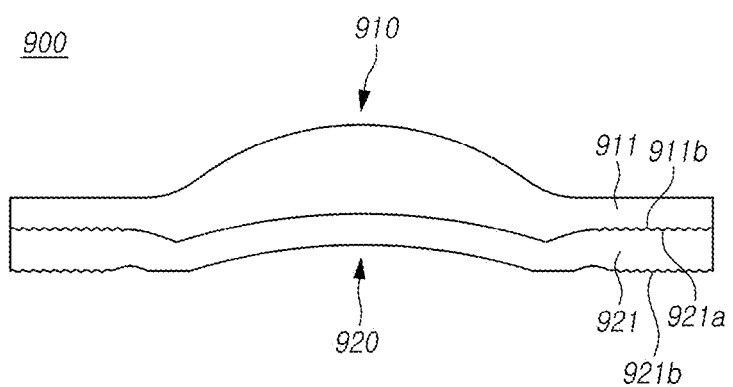
FIG. 9 is a cross-sectional view illustrating a compound lens according to an embodiment of the disclosure.

FIG. 9 is a cross-sectional view illustrating a compound lens (e.g., the compound lens 610 of FIG. 4) according to an embodiment of the disclosure.

Referring to FIG. 9, according to an embodiment, a compound lens 900 may have a structure in which two lenses 910 and 920 are adjacently bonded to each other. The adjacently bonded structure may be, for example, a structure in which the lower surface of the first lens 910 contacts to face the upper surface of the second lens 920. The first and second lenses 910 and 920 constituting the compound lens 900 may have the same diameter. In an embodiment, the lower surface 911*b* of the first flange 911 of the first lens 910 and the upper surface 921*a* of the second flange 921 of the second lens 920 may be formed to contact to face each other.

In an embodiment, the lower surface of the first flange 911 contacting to face the upper surface of the second flange 921 may include a roughened surface 911*b*. The upper surface of the second flange 921 contacting to face the lower surface of the first flange 911 may include a roughened surface 921*a*. In an embodiment, the roughened surfaces 911*b* and 921*a* may be provided on a partial lower surface of the first flange 911 or a partial upper surface of the second flange 921. The lower surface of the second flange 921 may also include a roughened surface 921*b*. The roughened surface 921*b* included in the lower surface of the second flange 921 may be provided to be vertically symmetrical with the roughened surface 921*a* included in the upper surface, but is not limited thereto.

Figure 10:
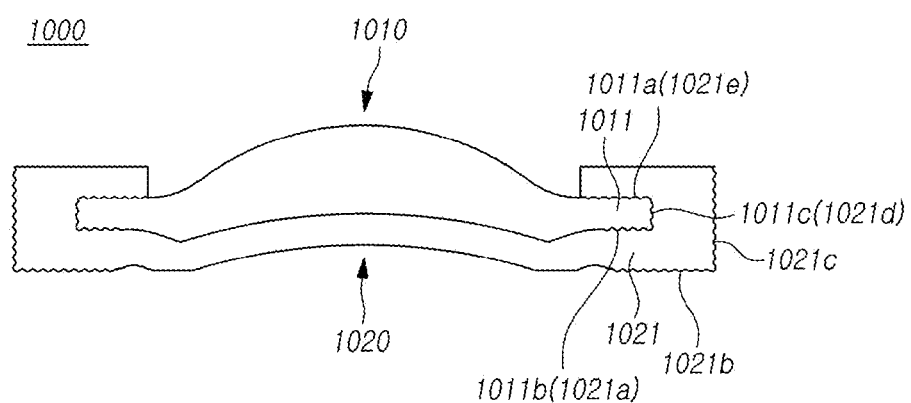
FIG. 10 is a cross-sectional view illustrating a compound lens according to an embodiment of the disclosure.

FIG. 10 is a cross-sectional view illustrating a compound lens (e.g., the compound lens 610 of FIG. 4) according to an embodiment of the disclosure.

Referring to FIG. 10, according to an embodiment, a compound lens 1000 may have a structure in which two lenses 1010 and 1020 are adjacently bonded to each other. The adjacently bonded structure may be a structure in which one (e.g., the second lens 1020) of the two lenses 1010 and 1020 is formed to surround the flange (e.g., the first flange 1011) of the other lens (e.g., the first lens 1010). The adjacently bonded structure may be, for example, a structure in which the edge (e.g., the first flange 1011) of the first lens 1010 is fitted into a fitting gap provided along the edge (e.g., the second flange 1021) of the second lens 1020. As described above, the adjacently bonded structure of the compound lens 1000 may prevent misalignment from the optical axis due to external impact or vibration by allowing one lens (e.g., the second lens 1020) to forcibly constrain the other lens (e.g., the first lens 1010) mechanically.

According to an embodiment, a partial surface of the first flange 1011 included in the first lens 1010 may include roughened surfaces 1011*a*, 1011*b*, and 1011*c*. According to an embodiment, a partial surface of the second flange 1021 included in the second lens 1020 may include roughened surfaces 1021*a*, 1021*b*, 1021*c*, 1021*d*, and 1021*e*. In an embodiment, the portion, fitted into the fitting gap provided in the second flange 1021 of the second lens 1020, in the first flange 1011 corresponding to the edge of the first lens 1010 may include first roughened surfaces 1011*a*, 1011*b*, and 1011*c*. The portion fitted into the fitting gap may include a partial upper surface, side surface or partial lower surface of the first flange 1011. The inner surface of the fitting gap provided in the second flange 1021 may include second roughened surfaces 1021*a*, 1021*d*, and 1021*e*. In an embodiment, the first roughened surfaces 1011a, 1011b, and 1011c may be disposed to face the second roughened surfaces 1021a, 1021d, and 1021e. In an embodiment, the second roughened surfaces 1021a, 1021d, and 1021e may be disposed to face the first roughened surfaces 1011a, 1011b, and 1011c. Among the first roughened surfaces 1011a, 1011b, and 1011c, the roughened surfaces 1011a and 1011b provided in a partial upper surface or a partial lower surface of the first flange 1011 may have first surface roughness. Among the second roughened surfaces 1021a, 1021d, and 1021e, the roughened surfaces 1021e and 1021a provided in the upper surface or lower surface included in the inner surface of the fitting gap of the second flange 1021 may have first surface roughness. Among the first roughened surfaces 1011a, 1011b, and 1011c, the roughened surface 1011c provided in a side surface of the first flange 1011 may have second surface roughness. Among the second roughened surfaces 1021a, 1021d, and 1021e, the roughened surface 1021d provided in the side surface included in the inner surface of the fitting gap of the second flange 1021 may have second surface roughness. Among the roughened surfaces 1021a, 1021b, 1021c, 1021d, and 1021e provided in the second flange 1021, the roughened surface 1021b provided in the lower surface of the other roughened surfaces 1021b and 1021c than the second roughened surfaces 1021a, 1021d, and 1021e may have first surface roughness, and the roughened surface 1021c provided in the side surface may have second surface roughness. The first surface roughness may be larger than, for example, the second surface roughness. The first surface roughness may have, for example, 0.05 to 10 μm arithmetic mean roughness. The second surface roughness may have, for example, 1 μm or less arithmetic mean roughness.

Figure 11:
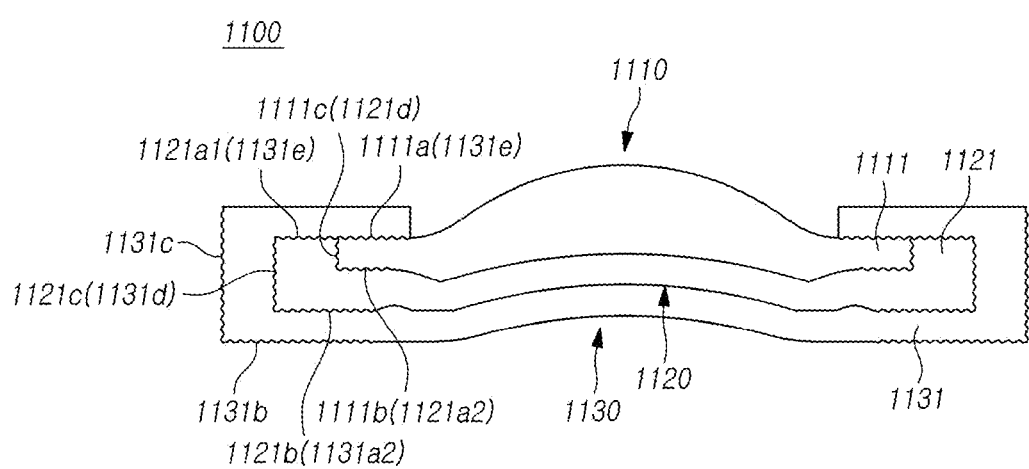
FIG. 11 is a cross-sectional view illustrating another compound lens according to an embodiment of the disclosure.

FIG. 11 is a cross-sectional view illustrating a compound lens (e.g., the compound lens 610 of FIG. 4) according to an embodiment of the disclosure.

Referring to FIG. 11, according to an embodiment, a compound lens 1100 may have a structure in which three lenses 1110, 1120, and 1130 are adjacently bonded to each other. The adjacently bonded structure may be a structure in which the flange (e.g., the third flange 1131) of one lens (e.g., the third lens 1130) among the three lenses 1110, 1120, and 1130 is formed to surround the flanges (e.g., the first flange 1111 and the second flange 1121) of the other two lenses (e.g., the first lens 1110 and the second lens 1120). The adjacently bonded structure may be, for example, a structure in which the edge (e.g., the first flange 1111) of the first lens 1110 and the edge (e.g., the second flange 1121) of the second lens 1120 are fitted into a fitting gap provided along the edge (e.g., the third flange 1131) of the third lens 1130.

As described above, the adjacently bonded structure of the compound lens 1100 may prevent misalignment from the optical axis due to external impact by allowing one lens (e.g., the third lens 1130) to forcibly constrain the other lenses (e.g., the first lens 1110 and the second lens 1120) mechanically.

According to an embodiment, a partial surface of the first flange 1111 included in the first lens 1110 may include roughened surfaces 1111a, 1111b, and 1111c. According to an embodiment, a partial surface of the second flange 1121 included in the second lens 1120 may also include roughened surfaces 1121a1, 1121a2, 1121b, 1121c, and 1121d. According to an embodiment, a partial surface of the third flange 1131 included in the third lens 1130 may include roughened surfaces 1131a2, 1131b, 1131c, 1131d, and 1131e. In an embodiment, the first flange 1111 may include first roughened surfaces 1111a, 1111b, and 1111c. The first roughened surfaces 1111a, 1111b, and 1111c may be provided in a partial surface of the first flange 1111. The partial surface of the first flange 1111 provided with the first roughened surfaces 1111a, 1111b, and 1111c may be a lower surface, an upper surface, or a side surface, but is not limited thereto. In an embodiment, the second flange 1121 may include second roughened surfaces 1121a1, 1121a2, 1121b, 1121c, and 1121d. The second roughened surfaces 1121a1, 1121a2, 1121b, 1121c, and 1121d may be provided in a partial surface of the second flange 1121. The partial surface of the second flange 1121 provided with the second roughened surfaces 1121a1, 1121a2, 1121b, 1121c, and 1121d may be an inner upper surface, an inner side surface, a lower surface, or an outer surface, but is not limited thereto. In an embodiment, the third flange 1131 may include third roughened surfaces 1131a2, 1131b, 1131c, 1131d, and 1131e. The third roughened surfaces 1131a2, 1131b, 1131c, 1131d, and 1131e may be provided in an inner and/or outer surface of the fitting gap provided in the third flange 1131. The inner surface of the fitting gap of the third flange 1131 provided with the third roughened surfaces 1131a2, 1131b, 1131c, 1131d, and 1131e may be an upper surface, a lower surface, or a side surface, but is not limited thereto.

In an embodiment, among the first roughened surfaces 1111a, 1111b, and 1111c, the roughened surfaces 1111a and 1111b provided in a partial upper surface or partial lower surface of the first flange 1111 may have first surface roughness. Among the second roughened surfaces 1121a1, 1121a2, 1121b, 1121c, and 1121d, the roughened surfaces 1121a1, 1121a2, and 1121b provided in a partial upper surface or partial lower surface of the second flange 1121 may have first surface roughness. Among the third roughened surfaces 1131a2, 1131b, 1131c, 1131d, and 1131e, the roughened surfaces 1131a2, 1131b, and 1131e provided in the upper surface or lower surface included in the inner surface of the fitting gap of the third flange 1131 may have first surface roughness.

In an embodiment, among the first roughened surfaces 1111a, 1111b, and 1111c, the roughened surface 1111c provided in the side surface of the first flange 1111 may have second surface roughness. Among the second roughened surfaces 1121a1, 1121a2, 1121b, 1121c, and 1121d, the roughened surfaces 1121c and 1121d provided in the inner side surface or outer side surface of the second flange 1121 may have second surface roughness. Among the third roughened surfaces 1131a2, 1131b, 1131c, 1131d, and 1131e, the roughened surfaces 1131c and 1131d provided in the side surface included in the inner surface of the fitting gap of the third flange 1131 may have second surface roughness. The second surface roughness may be smaller than, for example, the first surface roughness. The first surface roughness may have, for example, 0.05 to 10 μm arithmetic mean roughness. The second surface roughness may have, for example, 1 μm or less arithmetic mean roughness.

Figure 12:
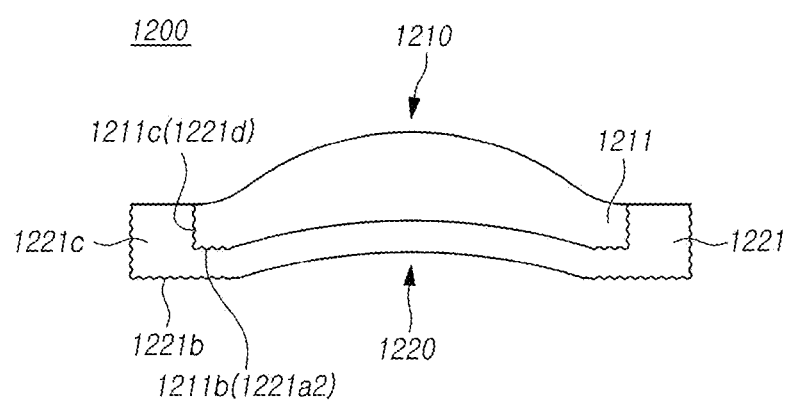
FIG. 12 is a cross-sectional view illustrating another compound lens according to an embodiment of the disclosure.

FIG. 12 is a cross-sectional view illustrating a compound lens (e.g., the compound lens 610 of FIG. 4) according to an embodiment of the disclosure.

Referring to FIG. 12, according to an embodiment, a compound lens 1200 may have a structure in which two lenses 1210 and 1220 are adjacently bonded to each other. The adjacently bonded structure may be, for example, a structure in which two opposite side surfaces of the first lens 1210 contact to face the upper inner surface of the second lens 1220, and the lower surface of the first lens 1210 contacts to face the inner upper surface of the second lens 1220. The inner upper surface of the second lens 1220 may correspond to the upper surface of the edge (e.g., second flange 1221) formed along the circumference of the second lens 1220.

According to an embodiment, at least one of the plurality of lenses constituting the compound lens 1200 may omit the flange. Referring to FIG. 12, the first lens 1210 may omit the configuration of the flange. The second flange 1221 of the second lens 1220 may be formed to surround, for example, at least a portion of the outer circumferential portion 1211 of the first lens 1210, constituting the compound lens 1200.

According to an embodiment, of the two lenses 1210 and 1220 constituting the compound lens 1200, the second lens 1220 may have a structure forcibly constraining the first lens 1210 mechanically. The first lens 1210 may be mechanically constrained by the second flange 1221 of the second lens 1220, for example. In an embodiment, of the two lenses 1210 and 1220 constituting the compound lens 1200, the second lens 1220 may be formed to surround the outer circumferential surface of the first lens 1210.

As described above, the adjacently bonded structure of the compound lens 1200 may prevent misalignment from the optical axis due to external impact by allowing one lens (e.g., the second lens 1220) to forcibly constrain the other lens (e.g., the first lens 1210) mechanically.

According to an embodiment, the first lens 1210 may include first roughened surfaces 1211*b* and 1121*c*. The first roughened surfaces 1211*b* and 1121*c* may be provided in a partial surface of the first lens 1210. In an embodiment, the lower surface or side surface of the outer circumferential portion 1211 of the first lens 1210 may include the first roughened surfaces 1211*b* and 1121*c*, but is not limited thereto.

According to an embodiment, the second flange 1221 may include second roughened surfaces 1221*a*2, 1221*b*, 1221*c*, and 1221*d*. The second roughened surfaces 1221*a*2, 1221*b*, 1221*c*, and 1221*d* may be provided in a partial surface of the second flange 1221. In an embodiment, the inner upper surface, inner side surface, lower surface, or outer side surface of the second flange 1221 may include second roughened surfaces 1221*a*2, 1221*b*, 1221*c*, and 1221*d*, but is not limited thereto.

According to an embodiment, the whole or part of the contacting or facing surfaces of the outer circumferential portion 1211 of the first lens 1210 and the second flange 1221 may include roughened surfaces 1211*b* (1221*a*2) and 1211*c* (1221*d*). In an embodiment, the first roughened surfaces 1211*b* and 1211*c* provided in the outer circumferential portion 1211 may be disposed to face the second roughened surfaces 1221*a*2 and 1221*d* provided in the second flange 1221. In an embodiment, the second roughened surfaces 1221*a*2 and 1221*d* provided in the second flange 1221 may be disposed to face the first roughened surfaces 1211*b* and 1211*c* provided in the outer circumferential portion 1211.

According to an embodiment, the first surface roughness of the roughened surfaces 1211*b*, 1221*a*2, and 1221*b* provided in the upper surface or lower surface of the second flange 1221 or the outer circumferential portion 1211 of the first lens 1210 may be larger than the second surface roughness of the roughened surfaces 1211*c*, 1221*d*, and 1221*c* provided in the side surface of the second flange 1221 or the outer circumferential portion 1211. The first surface roughness may have, for example, 0.05 to 10 μm arithmetic mean roughness. The second surface roughness may have, for example, 1 μm or less arithmetic mean roughness.

Although electronic devices tend to reduce in size, camera modules mounted in electronic devices have higher specifications. Typically, more lenses are included in the camera module to provide higher specifications to the camera module. However, an increase in the number of lenses is limited due to a spatial limitations in the downsized electronic device.

According to an embodiment of the disclosure, there may be provided an electronic device including a camera module provided with a roughened surface as a light blocking/restricting layer in the other area (flange area) than the capturing area between the compound lenses constituting a multi-layer lens.

According to an embodiment, a camera module (e.g., the camera module 400 of FIG. 4) may comprise a lens housing (e.g., the lens housing 500 of FIG. 4) and at least one compound lens (e.g., the compound lens 610 of FIG. 4) disposed in the lens housing 500 and including a first lens (e.g., the first lens 6111 of FIG. 4) and a second lens (e.g., the second lens 6112 of FIG. 4). At least a portion of facing surfaces of a first flange (e.g., the first flange 6121 of FIG. 4) of the first lens 6111 and a second flange (e.g., the second flange 6122 of FIG. 4) of the second lens 6112 may include a roughened surface (e.g., the roughened surface 6121*a*, 6121*b*, 6122*a*, 6122*b*, or 6122*c* of FIG. 5).

According to an embodiment, the first lens 6111 or the second lens 6112 may include a surface-coated coating portion (e.g., the coating portion 614 of FIG. 5).

According to an embodiment, a thickness of the coating portion 614 may be 100 nm to 700 nm.

According to an embodiment, the first flange 6121 or the second flange 6122 may include an upper surface 6121*a* or 6122*a* or a lower surface 6121*b* or 6122*b* including a roughened surface having a first surface roughness. A side surface 6121*c* or 6122*c* of the first flange 6121 or the second flange 6122 may include a roughened surface having a second surface roughness smaller than the first surface roughness.

According to an embodiment, the second surface roughness may have an arithmetic mean roughness (Ra) of 1 μm or less.

According to an embodiment, the first lens 6111 may include a first light transmitting portion 6131 defined as an inner area of the first flange 6121. The second lens 6112 may include a second light transmitting portion 6132 defined as an inner area of the second flange 6122.

According to an embodiment, no gap may be formed between the first light transmitting portion 6131 and the second light transmitting portion 6132.

According to an embodiment, the first lens 6111 and the second lens 6112 may have different glass transition temperatures.

According to an embodiment, a diameter (R1) of the first lens 6111 may be smaller than a diameter (R2) of the second lens 6112.

According to an embodiment, the second flange 6122 may be formed to surround a portion of an upper surface of the first flange 6121 or a side surface of the first flange 6121.

According to an embodiment, the roughened surface 6121*a*, 6121*b*, 6122*a*, 6122*b*, or 6122*c* may be formed by injection-molding.

According to an embodiment, the roughened surface 6121*a*, 6121*b*, 6122*a*, 6122*b*, or 6122*c* may be formed by one of corrosion, electric discharge, blasting, or laser.

According to an embodiment, the first lens 6111 may have a positive refractive power. The second lens 6112 may have a negative refractive power.

According to an embodiment, an electronic device (e.g., the electronic device 101 of FIG. 1, the electronic device 200 of FIG. 2A, or the electronic device 300 of FIG. 3) may comprise a device housing (e.g., the device housing 210 of FIG. 2A) and a camera module 400 including a lens housing 500, at least one compound lens 610 disposed in the lens housing 500 and including a first lens 6111 and a second lens 6112, and disposed toward one surface of the device housing 210 inside the device housing 210. The at least one compound lens 610 may be disposed in the lens housing 500 and include a first lens 6111 and a second lens 6112. At least a portion of facing surfaces of a first flange 6121 of the first lens 6111 and a second flange 6122 of the second lens 6112 may include a roughened surface 6121a, 6121b, 6122a, 6122b, or 6122c.

According to an embodiment, the first lens 6111 or the second lens 6112 may include a surface-coated coating portion 614.

According to an embodiment, the first flange 6121 or the second flange 6122 may include an upper surface or a lower surface including a roughened surface having a first surface roughness. A side surface of the first flange 6121 or the second flange 6122 may include a roughened surface having a second surface roughness smaller than the first surface roughness.

According to an embodiment, the first lens 6111 may include a first light transmitting portion 6131 defined as an inner area of the first flange 6121. The second lens 6112 may include a second light transmitting portion 6132 defined as an inner area of the second flange 6122. No gap may be formed between the first light transmitting portion 6131 and the second light transmitting portion 6132.

According to an embodiment, the first lens 6111 and the second lens 6112 may have different glass transition temperatures.

According to an embodiment, the second flange 6122 may be formed to surround a portion of an upper surface of the first flange 6121 or a side surface of the first flange 6121.

According to an embodiment, the first lens 6111 may have a positive refractive power. The second lens 6112 may have a negative refractive power.

According to an embodiment, the roughened surface 6121a, 6121b, 6122a, 6122b, or 6122c may be formed by one of corrosion, electric discharge, blasting, or laser.

According to various embodiments of the disclosure, more lenses may be included in the camera module even in a limited space by decreasing the height of the lens assembly.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

The terms as used herein are provided merely to describe some embodiments thereof, but are not intended to limit the disclosure. As used herein, the singular forms "a," "an," and "the" are intended to include the plural forms as well, unless the context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

As used herein, the terms "configured to" may be interchangeably used with the terms "suitable for," "having the capacity to," "designed to," "adapted to," "made to," or "capable of" depending on circumstances. The term "configured to" does not essentially mean "specifically designed in hardware to." Rather, the term "configured to" may mean that a device can perform an operation together with another device or parts. For example, a 'device configured (or set) to perform A, B, and C' may be a dedicated device to perform the corresponding operation or may mean a general-purpose device capable of various operations including the corresponding operation.

Meanwhile, the terms "upper side", "lower side", and "front and rear directions" used in the disclosure are defined with respect to the drawings, and the shape and position of each component are not limited by these terms.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A camera module comprising:
a lens housing; and
at least one compound lens disposed in the lens housing and including a first lens and a second lens,
wherein at least a portion of facing surfaces of a first flange of the first lens and a second flange of the second lens comprises a roughened surface, and
wherein the second flange of the second lens is formed to surround and make contact with an outer circumferential surface of the first flange of the first lens.

2. The camera module of claim 1, wherein the first lens or the second lens comprises a surface-coated coating portion.

3. The camera module of claim 2, wherein a thickness of the surface-coated coating portion is 100 nanometers (nm) to 700 nm.

4. The camera module of claim 1, wherein the first flange and the second flange comprises:
an upper surface or a lower surface comprising the roughened surface having a first surface roughness; and
a side surface comprising the roughened surface having a second surface roughness smaller than the first surface roughness, the side surface of the first flange including the outer circumferential surface.

5. The camera module of claim 4, wherein the second surface roughness has an arithmetic mean roughness of 1 micrometer (μm) or less.

6. The camera module of claim 1,
wherein the first lens comprises a first light transmitting portion defined as an inner area of the first flange,
wherein the second lens comprises a second light transmitting portion defined as an inner area of the second flange, and
wherein no gap is formed between the first light transmitting portion and the second light transmitting portion.

7. The camera module of claim 1, wherein the first lens and the second lens have different glass transition temperatures.

8. The camera module of claim 1, wherein a diameter of the first lens is smaller than a diameter of the second lens.

9. The camera module of claim 8, wherein the second flange is further formed to surround a portion of an upper surface of the first flange and a side surface of the first flange, the side surface of the first flange including the outer circumferential surface.

10. The camera module of claim 1, wherein the roughened surface is formed by injection-molding.

11. The camera module of claim 1, wherein the roughened surface is formed by one of corrosion, electric discharge, blasting, or laser.

12. The camera module of claim 1,
wherein the first lens has a positive refractive power, and
wherein the second lens has a negative refractive power.

13. The camera module of claim 1,
wherein the outer circumferential surface of the first flange of the first lens includes the roughened surface, and
wherein an inner circumferential surface of the second flange of the second lens includes the roughened surface and contacts the outer circumferential surface of the first flange of the first lens.

14. An electronic device comprising:
a device housing; and
a camera module comprising:
 a lens housing, and
 at least one compound lens disposed in the lens housing, and comprising a first lens and a second lens,
wherein the camera module is disposed toward one surface of the device housing inside the device housing,
wherein at least a portion of facing surfaces of a first flange of the first lens and a second flange of the second lens comprises a roughened surface, and
wherein the second flange of the second lens is formed to surround and make contact with an outer circumferential surface of the first flange of the first lens.

15. The electronic device of claim 14, wherein the first lens or the second lens comprises a surface-coated coating portion.

16. The electronic device of claim 14, wherein the first flange and the second flange comprises:
an upper surface or a lower surface including the roughened surface having a first surface roughness, and
a side surface including the roughened surface having a second surface roughness smaller than the first surface roughness, the side surface of the first flange including the outer circumferential surface.

17. The electronic device of claim 14,
wherein the first lens comprises a first light transmitting portion defined as an inner area of the first flange,
wherein the second lens comprises a second light transmitting portion defined as an inner area of the second flange, and
wherein no gap is formed between the first light transmitting portion and the second light transmitting portion.

18. The electronic device of claim 14, wherein the first lens and the second lens have different glass transition temperatures.

19. The electronic device of claim 14, wherein the second flange is further formed to surround a portion of an upper surface of the first flange and a side surface of the first flange, the side surface of the first flange including the outer circumferential surface.

20. The electronic device of claim 14,
wherein the first lens has a positive refractive power, and
wherein the second lens has a negative refractive power.

21. The electronic device of claim 14, wherein the roughened surface is formed by one of injection-molding, corrosion, electric discharge, blasting, or laser.

* * * * *